(12) United States Patent
Pisklak et al.

(10) Patent No.: US 9,328,583 B2
(45) Date of Patent: *May 3, 2016

(54) SET-DELAYED CEMENT COMPOSITIONS COMPRISING PUMICE AND ASSOCIATED METHODS

(71) Applicant: Halliburton Energy Services, Inc., Houston, TX (US)

(72) Inventors: Thomas Jason Pisklak, Cypress, TX (US); Kyriacos Agapiou, Houston, TX (US); Juan Humberto Martinez, Houston, TX (US); Samuel Jason Lewis, Spring, TX (US); Lance Everett Brothers, Chickasha, OK (US); Pauline Akinyi Otieno, Houston, TX (US); Peter James Boul, Houston, TX (US); Matthew Grady Kellum, Spring, TX (US); Ronnie Glen Morgan, Waurika, OK (US)

(73) Assignee: Halliburton Energy Services, Inc., Houston, TX (US)

(*) Notice: Subject to any disclaimer, the term of this patent is extended or adjusted under 35 U.S.C. 154(b) by 97 days.

This patent is subject to a terminal disclaimer.

(21) Appl. No.: 14/221,479

(22) Filed: Mar. 21, 2014

(65) Prior Publication Data

US 2014/0202698 A1    Jul. 24, 2014

Related U.S. Application Data

(63) Continuation-in-part of application No. 13/417,001, filed on Mar. 9, 2012, now Pat. No. 8,851,173.

(51) Int. Cl.
*E21B 33/14* (2006.01)
*C09K 8/467* (2006.01)

(Continued)

(52) U.S. Cl.
CPC .............. *E21B 33/14* (2013.01); *C04B 28/18* (2013.01); *C04B 40/0658* (2013.01);
(Continued)

(58) Field of Classification Search
None
See application file for complete search history.

(56) References Cited

U.S. PATENT DOCUMENTS 2,848,051 A * 8/1958 Williams ................ C09K 8/42
                                                166/291
3,557,876 A    1/1971 Tragesser
(Continued)

FOREIGN PATENT DOCUMENTS

WO    9620899    7/1996

OTHER PUBLICATIONS

Official Action for U.S. Appl. No. 14/478,869 dated Feb. 26, 2015.
(Continued)

*Primary Examiner* — Angela M DiTrani
*Assistant Examiner* — Anuradha Ahuja
(74) *Attorney, Agent, or Firm* — Craig W. Roddy; Tumey L.L.P.

(57) ABSTRACT

Disclosed herein are cement compositions and methods of using set-delayed cement compositions in subterranean formations. An embodiment includes a method of cementing in a subterranean formation comprising: providing a cement composition comprising water, pumice, hydrated lime, a set retarder, and a strength enhancer, wherein the strength enhancer comprises at least one material selected from the group consisting of cement kiln dust, slag, amorphous silica, a pozzolan, and any combination thereof; introducing the cement composition into the subterranean formation; and allowing the cement composition to set in the subterranean formation.

17 Claims, 2 Drawing Sheets

(51) Int. Cl.
*E21B 33/138* (2006.01)
*C04B 28/18* (2006.01)
*C04B 40/06* (2006.01)

(52) U.S. Cl.
CPC .............. *C09K 8/467* (2013.01); *E21B 33/138* (2013.01); *Y02W 30/92* (2015.05); *Y02W 30/94* (2015.05); *Y02W 30/95* (2015.05)

(56) References Cited

U.S. PATENT DOCUMENTS

| | | | |
|---|---|---|---|
| 3,699,042 A | 10/1972 | Browning et al. | |
| 3,887,009 A | 6/1975 | Miller et al. | |
| 3,959,003 A | 5/1976 | Ostroot et al. | |
| 4,054,462 A * | 10/1977 | Stude | C09K 8/46 106/717 |
| 4,349,443 A | 9/1982 | Block | |
| 4,350,533 A | 9/1982 | Galer et al. | |
| 4,462,837 A * | 7/1984 | Baker | C04B 24/383 106/720 |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 4,875,937 A | 10/1989 | Viles | |
| 5,058,679 A | 10/1991 | Hale et al. | |
| 5,263,542 A | 11/1993 | Brothers | |
| 5,314,022 A | 5/1994 | Cowan et al. | |
| 5,447,197 A | 9/1995 | Rae et al. | |
| 5,501,277 A | 3/1996 | Onan | |
| 5,503,671 A | 4/1996 | Casabonne et al. | |
| 5,547,506 A | 8/1996 | Rae et al. | |
| 6,173,778 B1 | 1/2001 | Rae et al. | |
| 6,279,655 B1 | 8/2001 | Pafitis et al. | |
| 6,333,005 B1 | 12/2001 | Nguyen et al. | |
| 6,457,523 B1 | 10/2002 | Vijn et al. | |
| 6,488,762 B1 | 12/2002 | Shi | |
| 6,610,140 B2 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,204,307 B2 | 4/2007 | Roddy et al. | |
| 7,244,303 B2 | 7/2007 | Chatterji et al. | |
| 7,284,611 B2 | 10/2007 | Reddy et al. | |
| 7,338,923 B2 | 3/2008 | Roddy et al. | |
| 7,445,669 B2 | 11/2008 | Roddy et al. | |
| 7,478,675 B2 | 1/2009 | Roddy et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,617,870 B1 | 11/2009 | Roddy et al. | |
| 7,631,692 B2 | 12/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,757,765 B2 | 7/2010 | Hilleary et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,492,317 B2 | 7/2013 | Chatterji et al. | |
| 8,505,630 B2 | 8/2013 | Chatterji et al. | |
| 8,623,794 B2 | 1/2014 | Chatterji et al. | |
| 8,851,173 B2 * | 10/2014 | Brothers | C04B 28/18 106/792 |
| 9,212,534 B2 | 12/2015 | Ballew | |
| 2002/0050232 A1 * | 5/2002 | Yamashita | C04B 24/2647 106/802 |
| 2002/0162657 A1 | 11/2002 | Tumlin et al. | |
| 2003/0121456 A1 | 7/2003 | Griffith et al. | |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 * | 7/2004 | Goodwin | C04B 24/163 524/2 |
| 2004/0211342 A1 | 10/2004 | Sprouts et al. | |
| 2004/0226484 A1 | 11/2004 | Chatterji et al. | |
| 2005/0079016 A1 | 4/2005 | Greenwood et al. | |
| 2006/0025312 A1 | 2/2006 | Santra | |
| 2006/0041060 A1 * | 2/2006 | George | C04B 24/161 525/56 |
| 2006/0054320 A1 * | 3/2006 | Brothers | C04B 28/02 166/292 |
| 2006/0166834 A1 | 7/2006 | Roddy et al. | |
| 2006/0249054 A1 | 11/2006 | Brothers et al. | |
| 2006/0249289 A1 | 11/2006 | Brothers et al. | |
| 2007/0051280 A1 | 3/2007 | Fyten | |
| 2007/0089643 A1 * | 4/2007 | Roddy | C04B 28/06 106/692 |
| 2007/0125534 A1 * | 6/2007 | Reddy | C04B 28/06 166/277 |
| 2007/0235192 A1 | 10/2007 | Michaux et al. | |
| 2007/0289744 A1 | 12/2007 | Bingamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0020044 A1 * | 1/2009 | Constantz | C04B 14/26 106/738 |
| 2009/0038800 A1 * | 2/2009 | Ravi | C04B 28/02 166/292 |
| 2009/0105099 A1 | 4/2009 | Warrender et al. | |
| 2009/0124522 A1 | 5/2009 | Roddy | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 * | 2/2010 | Roddy | C04B 28/021 166/294 |
| 2010/0258312 A1 | 10/2010 | Brenneis et al. | |
| 2010/0270016 A1 | 10/2010 | Carelli et al. | |
| 2010/0273912 A1 | 10/2010 | Roddy et al. | |
| 2010/0282466 A1 * | 11/2010 | Brenneis | C04B 28/021 166/293 |
| 2010/0313795 A1 | 12/2010 | Guynn et al. | |
| 2011/0017452 A1 * | 1/2011 | Benkley | C04B 28/021 166/292 |
| 2011/0132605 A1 | 6/2011 | Sarap et al. | |
| 2011/0162845 A1 | 7/2011 | Ravi | |
| 2011/0305830 A1 * | 12/2011 | Frantz | C04B 28/001 427/230 |
| 2012/0018155 A1 | 1/2012 | Patil | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0249552 A1 | 10/2012 | Harvill et al. | |
| 2012/0251079 A1 | 10/2012 | Meschter et al. | |
| 2012/0252304 A1 | 10/2012 | Vaughn | |
| 2012/0291674 A1 | 11/2012 | Brenneis et al. | |
| 2012/0325478 A1 | 12/2012 | Muthusamy | |
| 2013/0233550 A1 | 9/2013 | Brothers et al. | |
| 2013/0248183 A1 | 9/2013 | Pisklak et al. | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |

(56) References Cited

U.S. PATENT DOCUMENTS

| | | | |
|---|---|---|---|
| 2014/0090843 | A1 | 4/2014 | Boul et al. |
| 2015/0175481 | A1 | 6/2015 | Pisklak |
| 2015/0175869 | A1 | 6/2015 | Agapiou |
| 2015/0197033 | A1 | 7/2015 | Agapiou |
| 2015/0197453 | A1 | 7/2015 | Pisklak |

OTHER PUBLICATIONS

Official Action for U.S. Appl. No. 14/098,198 dated Nov. 20, 2014.
Official Action for U.S. Appl. No. 14/067,143 dated Mar. 12, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US2014/054794 dated Sep. 9, 2014.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for International Application PCT/US14/068804 dated Mar. 17, 2015.
Search Report and Written Opinion for International Application PCT/US14/067112 dated Mar. 5, 2015.
Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.

OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics-Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
V-Mar 3 Concrete Rheology-Modifying Admixture Product Description available from Grace Construction at http://www.na.graceconstruction.com/ viewed on Oct. 2013.
Southern Clay Products Data Sheet for LAPONITE RD, available from http://www.rockwoodadditives.com/ and viewed on Oct. 2013.
Daxad 19 MSDS, available from Geo Specialty Chemicals at http://www.geosc.com/ and last revised Sep. 20, 2013.
Liquiment 5581F Product Description available from BASF at http://www.oilfield-solutions.basf.com/ viewed on Oct. 2013.
Ethacryl G Product Description available from Arkema at http://www.arkema.com/ viewed on Oct. 2013.
SA-1015 Suspending Agent Product Description available from Halliburton Energy Services at http://www.halliburton.com/ viewed on Oct. 2013.
WellLife 684 Additive Product Description available from Halliburton Energy Services at http://www.halliburton.com/ viewed on Oct. 2013.
Halad-344 Fluid Loss Additive Product Description available from Halliburton Energy Services at http://www.halliburton.com/ viewed on Oct. 2013.
Halliburton brochure for "SentinelCem Cement" dated May 2012.
ZoneSealant™ 2000 Agent Product Description available from http://www.halliburton.com/ viewed on Mar. 2014.
D-Air Defoamer Product Line Description available from http://www.halliburton.com/ viewed on Mar. 2014.
HES brochure Enhancer 923™ Cement Agent, H07745 Jun. 2010.
Ramy N.Eid, Liquid Cement: Changing the Paradigm, Society of Petroleum Engineers, Apr. 15, 2007.
U.S. Office Action for U.S. Appl. No. 13/417,001 dated Apr. 16, 2014.
Notice of Allowance for U.S. Appl. No. 13/417,001 dated Mar. 9, 2012.

(56) References Cited

OTHER PUBLICATIONS

Search Report and Written Opinion for International Application No. PCT/US2014/032150 dated Aug. 21, 2014.
ISRWO for PCT Application No. PCT/US2015/017564 dated Jun. 3, 2015.
ISRWO for PCT Application No. PCT/US2015/019709 dated May 22, 2015.
USPTO Office Action for U.S. Appl. No. 114/478,813 dated Sep. 10, 2015.
USPTO Office Action for U.S. Appl. No. 14/048,463 dated Sep. 24, 2015.
USPTO Office Action for U.S. Appl. No. 14/032,734 dated Sep. 24, 2015.
USPTO Office Action for U.S. Appl. No. 14/090,494 dated Sep. 24, 2015.
USPTO Office Action for U.S. Appl. No. 14/194,125 dated Oct. 16, 2015.
USPTO Office Action for U.S. Appl. No. 14/14/202,625 dated Oct. 21, 2015.
Final Official Action for U.S. Appl. No. 14/098,198 dated Jun. 19, 2015.
Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Final Official Action for U.S. Appl. No. 14/067,143 dated Aug. 12, 2015.
Official Action for U.S. Appl. No. 14/019,730 dated Jun. 3, 2015.
Official Action for U.S. Appl. No. 14/048,486 dated Aug. 17, 2015.
Official Action for U.S. Appl. No. 14/048,463 dated Sep. 9, 2015.
Official Action for U.S. Appl. No. 14/478,813 dated Sep. 10, 2015.
Final Official Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.

* cited by examiner

SET-DELAYED CEMENT COMPOSITIONS COMPRISING PUMICE AND ASSOCIATED METHODS

CROSS-REFERENCE TO RELATED APPLICATIONS

The present application is a continuation-in-part of U.S. patent application Ser. No. 13/417,001, entitled "Set-Delayed Cement Compositions Comprising Pumice and Associated Methods," filed on Mar. 9, 2012, the entire disclosure of which is incorporated herein by reference.

BACKGROUND

Embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions may benefit from an increase in compressive strength development. Specifically, boosts to early strength development as well as long term strength development would provide compositions capable of a being used in a broader variety of operations as compared to compositions that develop compressive strength slower or do not develop as much long term strength.

BRIEF DESCRIPTION OF THE DRAWINGS

These drawings illustrate certain aspects of some of the embodiments of the present method, and should not be used to limit or define the method.

DETAILED DESCRIPTION

Figure 1:
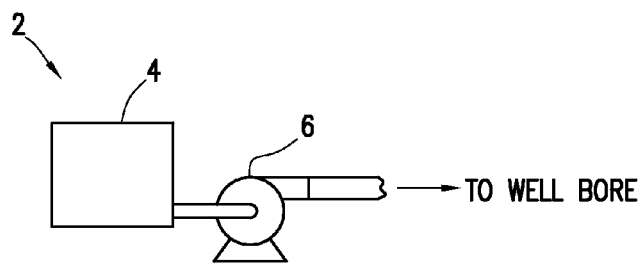
FIG. 1 illustrates a system for the preparation and delivery of a set-delayed cement composition to a wellbore in accordance with certain embodiments.

Embodiments relate to subterranean cementing operations and, in certain embodiments, to set-delayed cement compositions and methods of using set-delayed cement compositions in subterranean formations. In particular embodiments, the set-delayed cement compositions may be used with strength enhancers, such as cement kiln dust, slag, and/or a silica source (e.g., a pozzolan). Embodiments of the set-delayed cement compositions comprising strength enhancers may accelerate early strength development and/or may also achieve desirable thickening times and late term compressive strength development.

Embodiments of the set-delayed cement compositions may generally comprise water, pumice, hydrated lime, and a set retarder. Optionally, the set-delayed cement compositions may further comprise a dispersant, slag, cement kiln dust, amorphous silica, a pozzolan, and/or a cement set activator. Embodiments of the set-delayed cement compositions may be foamed. Advantageously, embodiments of the set-delayed cement compositions may be capable of remaining in a pumpable fluid state for an extended period of time. For example, the set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Pumice may be present in the -delayed cement compositions. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Hydrated lime may be present in the set-delayed cement compositions. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

A set retarder maybe present in the set-delayed cement compositions. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

A strength enhancer may be included in the set-delayed cement compositions. The strength enhancer may comprise cement kiln dust, slag, or combination thereof. The cement kiln dust or slag may be added to the set-delayed cement compositions prior to, concurrently with, or after activation. Cement kiln dust ("CKD") as that term is used herein, refers to a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. Slag as that term is used herein, refers to a granulated, blast furnace by-product formed in the production of various metals from their corresponding ores. By way of example, the production of cast iron can produce slag as a granulated, blast furnace by-product with the slag generally comprising the oxidized impurities found in iron ore. The slag may provide an easily soluble calcium silicate and calcium aluminate source that can aid strength development of the set-delayed cement compositions. The strength enhancer may be included in the set-delayed cement composition at any suitable time as desired for a particular application. By way of example, the strength enhancer may be included before or after activation of the set-delayed cement composition.

The CKD and/or slag may be included in embodiments of the set-delayed cement compositions in an amount suitable for a particular application. In some embodiments, the CKD and/or slag may be present in an amount of about 1% to about 400% by weight of the pumice, for example, about 1%, about 10%, about 50%, about 100%, about 250%, or about 400%. The CKD and/or slag may be used to enhance the 24 hour compressive strength by about 100% or greater. For example, the CKD or slag may be used to enhance the 24 hour compressive strength by about 100%, about 125%, about 150%, about 200% or more. Further, the CKD and/or slag may be used to enhance the 72 hour compressive strength by about 50% or greater. For example, the CKD or slag may be used to enhance the 72 hour compressive strength by about 50%, about 60%, about 75%, about 100% or more. One of ordinary skill in the art, with the benefit of this disclosure, will recognize the appropriate amount of the strength enhancer to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to set into a hardened mass. The teen "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

Some embodiments may include a cement set activator comprising nanosilica. As used herein, the term "nanosilica" refers to silica having a particle size of less than or equal to about 100 nanometers ("nm"). The size of the nanosilica may be measured using any suitable technique. It should be understood that the measured size of the nanosilica may vary based on measurement technique, sample preparation, and sample conditions such as temperature, concentration, etc. One technique for measuring the particle size of the nanosilica is Transmission Electron Microscopy (TEM). An example of a commercially available product based on laser diffraction is the ZETASIZER Nano ZS particle size analyzer supplied by Malvern Instruments, Worcerstershire, UK. In some embodiments, the nanosilica may comprise colloidal nanosilica. The nanosilica may be stabilized using any suitable technique. In some embodiments, the nanosilica may be stabilized with a metal oxide, such as lithium oxide, sodium oxide, potassium oxide, and/or a combination thereof. Additionally the nanosilica may be stabilized with an amine and/or a metal oxide as mentioned above. Embodiments of the nanosilicas have an additional advantage in that they have been known to fill in pore space in cements which can result in superior mechanical properties in the cement after it has set.

Some embodiments may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the set-delayed cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a set-delayed cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate, available from Halliburton Energy Services, Inc., as CFR-3™ dispersant. One example of a suitable polycarboxylated ether dispersant is Liquiment® 514L or 5581F dispersants, available from BASF Corporation, Houston, Tex.

The cement set activator may be added to embodiments of the set-delayed cement composition in an amount sufficient to induce the set-delayed cement composition to set into a hardened mass. In certain embodiments, the cement set activator may be added to the set-delayed cement composition in an amount in the range of about 0.1% to about 20% by weight of the pumice. In specific embodiments, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

Some embodiments of the cement set activator (including a liquid additive cement set activator) may comprise silica sources; for example, amorphous silica and/or a pozzolan for use as a strength enhancer. For example, a cement set activator may comprise calcium chloride and a silica source. The strength enhancers comprising a silica source may be used for enhancing early strength enhancement in a similar manner to the previously described cement kiln dust and/or slag strength enhancers. However, the strength enhancers comprising silica sources may be added to a cement set activator instead of directly to a set-delayed cement composition. In some embodiments, adding a strength enhancer comprising a silica source directly to a set-delayed cement composition may induce gelation or flash setting. However, embodiments comprising a cement set activator comprising a silica-source strength enhancer may not induce gelation or flash setting.

In embodiments, a strength enhancer comprising a silica source may comprise amorphous silica. Amorphous silica is a powder that may be included in embodiments of the cement set activators to increase cement compressive strength. Amorphous silica is generally a byproduct of a ferrosilicon production process, wherein the amorphous silica may be formed by oxidation and condensation of gaseous silicon suboxide, SiO, which is fowled as an intermediate during the process. An example of a suitable source of amorphous silica is Silicalite™ cement additive available from Halliburton Energy Services, Inc., Houston, Tex. Embodiments comprising strength enhancers may utilize the additional silica source as needed to enhance compressive strength.

In embodiments, a strength enhancer comprising a silica source may comprise a pozzolan. Examples of pozzolans include diatomaceous earth, metakaolin, zeolite, fly ash, volcanic ash, opaline shale, tuff, and combinations thereof. Embodiments comprising strength enhancers may utilize the additional silica source as needed to enhance compressive strength.

A variety of fly ashes may be suitable for use as silica sources for embodiments comprising strength enhancers. Fly ash may include fly ash classified as Class C and Class F fly ash according to American Petroleum Institute, API Specification for Materials and Testing for Well Cements, API Specification 10, Fifth Ed., Jul. 1, 1990. Suitable examples of fly ash include, but are not limited to, POZMIX® A cement additive, commercially available from Halliburton Energy Services, Inc., Houston, Tex.

Metakaolin may be suitable for use as a silica source for embodiments comprising strength enhancers. Generally, metakaolin is a white pozzolan that may be prepared by heating kaolin clay to temperatures in the range of about 600° to about 800° C.

Diatomaceous earth may be suitable for use as a silica source for embodiments comprising strength enhancers. Diatomaceous earth is a soft bulky solid material primarily composed of silica. Generally diatomaceous earth is derived from the fossilized remains of the skeletons of small prehistoric aquatic plants referred to as diatoms. It is generally available as a powder. An example of a suitable source of diatomaceous earth is Diacel D™ cement additive available from Halliburton Energy Services, Inc., Houston, Tex.

Zeolites may be suitable for use as a silica source for embodiments comprising strength enhancers. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite. An example of a suitable source of zeolite is Valfor-100® zeolite or Advera® 401 zeolite available from the PQ Corporation, Malvern, Pa.

The silica-source strength enhancer may be added to embodiments of the cement set activator in an amount sufficient to increase the compressive strength of a set-delayed cement composition. In certain embodiments, the silica source may be added to cement set activator in an amount in the range of about 0.1% to about 20% by weight of the pumice. In specific embodiments, the silica-source strength enhancer may be present in the cement set activator in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of silica-source strength enhancer to include for a chosen application.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, pumice, hydrated lime, a set retarder, and optionally a dispersant. A strength enhancer may be included in the set-delayed cement composition. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition. A silica-source strength enhancer may be included in the cement set activator.

In some embodiments, a set-delayed cement composition may be provided that comprises water, pumice, hydrated lime, a set retarder, and optionally a dispersant and/or strength enhancer. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator which may comprise a strength enhancer, introduced into a subterranean formation, and allowed to set therein.

In primary cementing embodiments, for example, the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore.

The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An embodiment includes a method of cementing in a subterranean formation comprising: providing a cement composition comprising water, pumice, hydrated lime, a set retarder, and a strength enhancer, wherein the strength enhancer comprises at least one material selected from the group consisting of cement kiln dust, slag, amorphous silica, a pozzolan, and any combination thereof; introducing the cement composition into the subterranean formation; and allowing the cement composition to set in the subterranean formation. The components of the cement composition including the strength enhancer are described in more detail in connection with the embodiments discussed above. The cement composition may be set-delayed as described in the embodiments discussed above. Cement set activators such as those described previously may be used for activation of the cement composition.

An embodiment includes a cement composition comprising: water; pumice; hydrated lime; a set retarder; and a strength enhancer, wherein the strength enhancer is selected from the group consisting of cement kiln dust, slag, amorphous silica, and a pozzolan. The components of the cement composition including the strength enhancer are described in more detail in connection with the embodiments discussed above. The cement composition may be set-delayed as described in the embodiments discussed above. Cement set activators such as those described previously may be used for activation of the cement composition.

An embodiment includes a cementing system comprising a cement composition comprising: water, pumice, hydrated lime, a set retarder, and a strength enhancer, wherein the strength enhancer is selected from the group consisting of cement kiln dust, slag, amorphous silica, and a pozzolan. The system may further comprise mixing equipment capable of mixing the cement composition. The system may further comprise pumping equipment capable of pumping the cement composition. The components of the cement composition including the strength enhancer are described in more detail in connection with the embodiments discussed above. The cement composition may be set-delayed as described in the embodiments discussed above. Cement set activators such as those described previously may be used for activation of the cement composition.

Referring now to FIG. 1, the preparation of a set-delayed cement composition in accordance with example embodiments will now be described. FIG. 1 illustrates a system 2 for the preparation of a set-delayed cement composition and subsequent delivery of the composition to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit.

Figure 2:
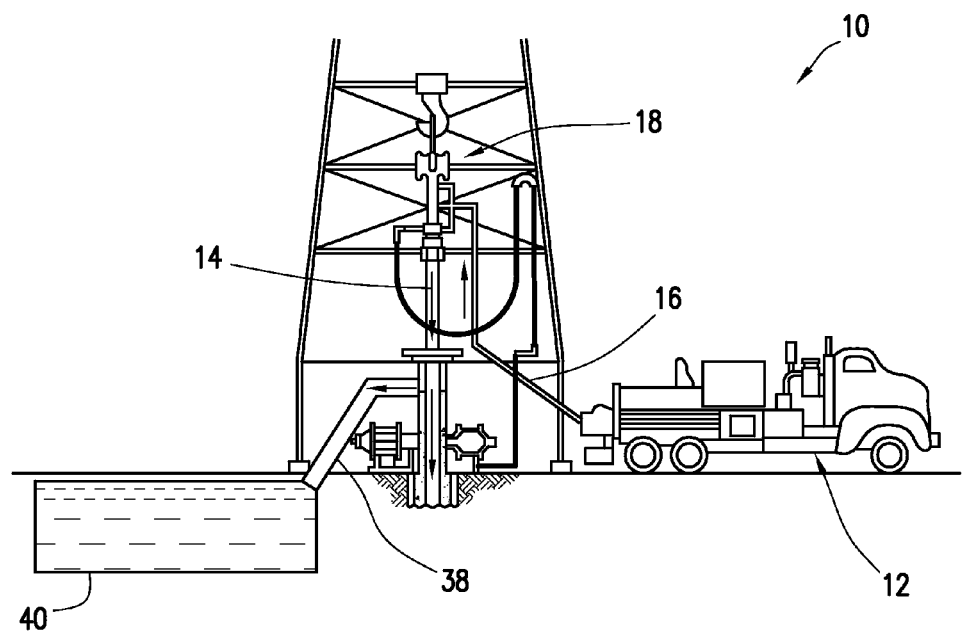
FIG. 2 illustrates surface equipment that may be used in the placement of a set-delayed cement composition in a wellbore in accordance with certain embodiments.

An example technique for placing a set-delayed cement composition into a subterranean formation will now be described with reference to FIGS. 2 and 3. FIG. 2 illustrates surface equipment 10 that may be used in placement of a set-delayed cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 3:
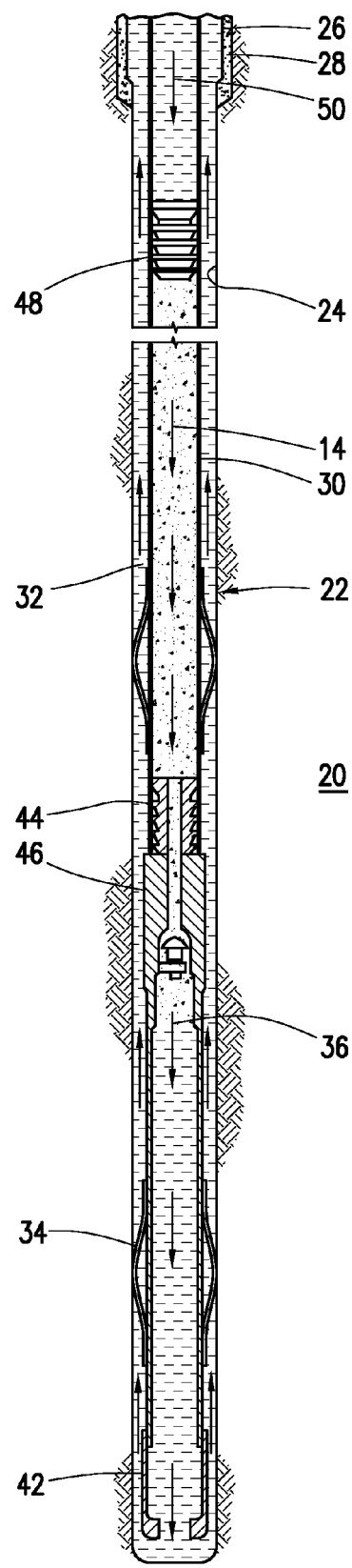
FIG. 3 illustrates the placement of a set-delayed cement composition into a wellbore annulus in accordance with certain embodiments.

Turning now to FIG. 3, the set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 fainted between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the set-delayed cement composition 14 may be pumped down the interior of the casing 30. The set-delayed cement composition 14 may be allowed to flow down the interior of the casing 30 through the casing shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device should rupture to allow the set-delayed cement composition 14 through the bottom plug 44. In FIG. 3, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Example 1

The following example describes a set-delayed cement composition comprising a cement-kiln-dust strength enhancer. Three example set-delayed cement compositions were prepared. The three compositions comprised water; DS-325 lightweight aggregate pumice, available from Hess Pumice Products, Inc., Malad, Id.; hydrated lime; Liquiment 5581F® dispersant, available from BASF Corporation, Houston, Tex.; Micro Matrix® cement retarder (MMCR), available from Halliburton Energy Services, Inc., Houston, Tex.; co-retarder HR®-5 cement retarder available from Halliburton Energy Services, Inc., Houston, Tex.; MicroMax® weight additive available from Halliburton Energy Services, Inc., Houston, Tex.; viscosifier SA-1015™ suspending agent available from Halliburton Energy Services, Inc., Houston, Tex.; and optionally strength enhancer Cement kiln dust. The compositional makeup of all three samples is presented in Table 1 below.

TABLE 1

Example Set-Delayed Cement Compositions

| Component | Sample 1 (g) | Sample 2 (g) | Sample 3 (g) |
|---|---|---|---|
| Water | 600.0 | 600.0 | 600.0 |
| Pumice | 1000.0 | 800.0 | 200.0 |
| Hydrated Lime | 200.0 | 200.0 | 200.0 |
| Dispersant | 6.0 | 6.0 | 6.0 |
| Retarder | 12.5 | 12.5 | 12.5 |
| Co-Retarder | 5.0 | 5.0 | 5.0 |
| Weighting Agent | 20.0 | 20.0 | 20.0 |
| Viscosifier | 0.35 | 0.35 | 0.35 |
| Cement kiln dust | 0.0 | 200.0 | 800.0 |

Each slurry was aged for over 1 week. Rheology measurements were taken at day 0 (after initial mixing), day 4, and day 7. The rheology was measured using a Model 35A Fann Viscometer and a No. 1 spring with a Fann Yield Stress Adapter, in accordance with the procedure set forth in API RP Practice 10B-2, *Recommended Practice for Testing Well Cements*. The data is presented in Table 2 below.

TABLE 2

| | | Sample Rheologies | | | | | | | |
|---|---|---|---|---|---|---|---|---|---|
| Sample | Age (Days) | 3 | 6 | 100 | 200 | 300 | 600 | Plastic Viscosity (cP) | Yield Point (lbf/100 ft$^2$) |
| 1 | 0 | 8.5 | 11.5 | 17 | 25 | 31 | 58 | 221 | 8.9 |
| 1 | 4 | 2 | 3.5 | 15 | 24 | 33.5 | 67 | 286 | 2.8 |
| 1 | 7 | 7.5 | 9 | 19 | 28.5 | 37.5 | 72 | 290 | 8.4 |
| 2 | 0 | 5.5 | 7.5 | 40.5 | 73 | 105.5 | 209 | 890 | 4.3 |
| 2* | 4 | 4 | 4 | 27 | 51 | 77.5 | 154 | 674 | 2.6 |
| 2** | 7 | 37 | 37 | 69 | 92 | 107 | 163 | 762 | 43.1 |

TABLE 2-continued

Sample Rheologies

| Sample | Age (Days) | 3 | 6 | 100 | 200 | 300 | 600 | Plastic Viscosity (cP) | Yield Point (lbf/100 ft$^2$) |
|---|---|---|---|---|---|---|---|---|---|
| 3 | 0 | 4 | 5.5 | 39.5 | 82 | 130.5 | 280 | 1214 | 1.7 |
| 3*** | 4 | 5.5 | 7 | 39.5 | 73.5 | 110 | 232 | 1008 | 2.7 |
| 3 | 7 | 16 | 18 | 84 | 150 | 217 | +300 | 1198 | 10.9 |

*1.6 g additional dispersant added,
**5.7 g additional dispersant added,
***2.0 g additional dispersant added.

Next a liquid additive cement set activator was prepared that comprised water, a polyphosphate (sodium hexametaphosphate), a monovalent salt (sodium sulfate), and Liquiment 5581F® dispersant, available from BASF Corporation, Houston, Tex. 118.9 g of the cement set activator was added to each sample. The composition for the liquid additive cement set activator is presented in Table 3 below.

TABLE 3

Cement Set Activator Composition

| Component | Amount (g) |
|---|---|
| Water | 600.0 |
| Polyphosphate | 62.7 |
| Monovalent Salt | 62.7 |
| Dispersant | 20.0 |

In order to determine the effect of cement kiln dust on the compressive strength of the activated samples, the compressive strength of each sample was measured after curing for twenty-four and seventy-two hours. The destructive compressive strength was measured by allowing the samples to cure in a 2" by 4" plastic cylinder that was placed in a water bath at 140° F. to form set cylinders. Immediately after removal from the water bath, destructive compressive strengths were determined using a mechanical press in accordance with API RP 10B-2, *Recommended Practice for Testing Well Cements*. The results of this test are set forth below in Table 4, in units of psi. The reported compressive strengths are an average for three cylinders of each sample.

TABLE 4

Compressive Strength Tests

| Sample | 24-Hour CS (psi) | 72-Hour CS (psi) |
|---|---|---|
| 1 | 828 | 1678 |
| 2 | 1888 | 2875 |
| 3 | 2335 | 2562 |

Example 1 illustrates that cement kiln dust can function as a strength enhancer for set-delayed cement compositions.

Example 2

The following example describes a set-delayed cement composition comprising a slag strength enhancer. Three example activated set-delayed cement compositions were prepared. The three compositions comprised water; DS-325 lightweight aggregate pumice, available from Hess Pumice Products, Inc., Malad, Id.; hydrated lime; Liquiment 5581F® dispersant, available from BASF Corporation, Houston, Tex.; Micro Matrix® cement retarder (MMCR), available from Halliburton Energy Services, Inc., Houston, Tex.; co-retarder HR®-5 cement retarder available from Halliburton Energy Services, Inc., Houston, Tex.; MicroMax® weight additive available from Halliburton Energy Services, Inc., Houston, Tex.; viscosifier SA-1015™ suspending agent available from Halliburton Energy Services, Inc., Houston, Tex.; and optionally strength enhancer Slag. Additionally, the samples were activated with a solution of CaCl$_2$. The compositional makeup of all three samples is presented in Table 5 below.

TABLE 5

Example Set-Delayed Cement Compositions

| Component | Sample 4 Wt. (g) | Sample 4 bwoP* | Sample 5 Wt. (g) | Sample 5 bwoP* | Sample 6 Wt. (g) | Sample 6 bwoP* |
|---|---|---|---|---|---|---|
| Water | 272.16 | 60 | 272.16 | 60 | 272.16 | 60 |
| Pumice | 453.6 | 100 | 453.6 | 100 | 453.6 | 100 |
| Hydrated Lime | 90.72 | 20 | 90.72 | 20 | 90.72 | 20 |
| Dispersant | 2.72 | 0.6 | 2.72 | 0.6 | 2.72 | 0.6 |
| Retarder | 5.67 | 1.25 | 5.67 | 1.25 | 5.67 | 1.25 |
| Co-Retarder | 1.13 | 0.25 | 1.13 | 0.25 | 1.13 | 0.25 |
| Weighting Agent | 9.07 | 2.0 | 9.07 | 2.0 | 9.07 | 2.0 |
| Viscosifier | 0.16 | 0.035 | 0.16 | 0.035 | 0.16 | 0.035 |
| Slag | 0 | 0 | 45.4 | 10 | 90.7 | 20 |
| Activator | 45.36 | 10 | 45.36 | 10 | 45.36 | 10 |

*% by weight of pumice.

In order to determine the effect of slag on the compressive strength of the activated samples, the compressive strength of each sample was measured after curing for twenty-four hours. The destructive compressive strength was measured by allowing the samples to cure in a 2" by 4" plastic cylinder that was placed in a water bath at 140° F. to foam set cylinders. Immediately after removal from the water bath, destructive compressive strengths were determined using a mechanical press in accordance with API RP 10B-2, *Recommended Practice for Testing Well Cements*. The results of this test are set forth below in Table 6, in units of psi. The reported compressive strengths are an average for three cylinders of each sample.

TABLE 6

Compressive Strength Tests

| Sample | 24-Hour CS |
|---|---|
| 4 | 124 |
| 5 | 460 |
| 6 | 837 |

Example 2 illustrates that slag can function as a strength enhancer for set-delayed cement compositions.

Example 3

The following example utilized cement set activators comprising strength enhancers composed of different silica sources to show the effect of different silica sources on the strength enhancement of a set-delayed cement composition. A control sample was prepared that comprised only $CaCl_2$ (43% of total cement set activator solution) and water. Each experimental cement set activator solution comprised water, calcium chloride, and a silica source. The makeup of the experimental cement set activators is described in Table 7 below.

TABLE 7

Cement Set Activator Composition

| Component | Amount (g) | Wt. % |
|---|---|---|
| Water | 200.0 | 46.4 |
| $CaCl_2$ | 150.9 | 35.0 |
| Silica Source | 80.0 | 18.6 |

Silica sources were chosen from an amorphous silica, diatomaceous earth, metakaolin, ground D50 pumice, zeolite, and Class F fly ash. Each silica source was present in an amount of 5% of the weight of the pumice ("bwoP") used in the set-delayed cement composition, and $CaCl_2$ was present in an amount of 10% bwoP.

The set-delayed cement composition comprised water; DS-325 lightweight aggregate pumice, available from Hess Pumice Products, Inc., Malad, Id.; hydrated lime; Liquiment 5581F® dispersant, available from BASF Corporation, Houston, Tex.; Micro Matrix® cement retarder (MMCR), available from Halliburton Energy Services, Inc., Houston, Tex.; co-retarder HR®-5 cement retarder available from Halliburton Energy Services, Inc., Houston, Tex.; MicroMax® weight additive available from Halliburton Energy Services, Inc., Houston, Tex.; viscosifier SA-1015™ suspending agent available from Halliburton Energy Services, Inc., Houston, Tex.; and optionally strength enhancer cement kiln dust. The compositional makeup of all three samples is presented in Table 8 below.

TABLE 8

Example Set-Delayed Cement Composition

| Component | Amount (% bwoP) |
|---|---|
| Water | 60 |
| Pumice | 100 |
| Hydrated Lime | 20 |
| Dispersant | 0.60 |
| Retarder | 1.25 |
| Co-Retarder | 0.5 |
| Weighting Agent | 2.0 |
| Viscosifier | 0.035 |

After activation, the destructive compressive strength of each sample was measured by allowing the samples to cure for 24 hours in 2" by 4" plastic cylinders that were placed in a water bath at 140° F. to form set cylinders. Immediately after removal from the water bath, destructive compressive strengths were determined using a mechanical press in accordance with API RP 10B-2, *Recommended Practice for Testing Well Cements*. The results of this test are set forth below in Table 9 in units of psi. The reported compressive strengths are an average for three cylinders of each sample.

TABLE 9

Compressive Strength Tests

| Activator Component | Density (ppg) | 24-Hour CS (psi) |
|---|---|---|
| Control | 13.6 | 124 |
| Amorphous Silica | 13.6 | 502 |
| Diatomaceous Earth | 13.6 | 775 |
| Metakaolin | 13.6 | 659 |
| D50 Pumice | 13.6 | 597 |
| Zeolite | 13.6 | 589 |
| Class F Fly Ash | 13.6 | 422 |

The results indicate that adding a strength enhancer comprising a silica source to the cement set activator increased the 24-hour compressive strength of the set-delayed cement composition.

Example 4

In this example, the same set-delayed cement composition from Example 3 was activated with cement set activators comprising varying concentrations of a pozzolan. The $CaCl_2$ was held constant and the densities for all samples were kept constant by varying the amount of water, such that the only different in each sample was the amount of the pozzolan. The pozzolan chosen for the experiment was diatomaceous earth.

After the set-delayed cement composition was exposed to the cement set activator, the destructive compressive strength of each sample was measured by allowing the samples to cure for 24 hours in 2" by 4" plastic cylinders that were placed in a water bath at 160° F. to form set cylinders. Immediately after removal from the water bath, destructive compressive strengths were determined using a mechanical press in accordance with API RP 10B-2, *Recommended Practice for Testing Well Cements*. The results of this test are set forth below in Table 10 in units of psi. The reported compressive strengths are an average for three cylinders of each sample.

TABLE 10

Compressive Strength Tests

| Diatomaceous Earth Amount (% by weight of Pumice) | Density (ppg) | 24-Hour CS (psi) |
|---|---|---|
| 0 | 13.6 | 53 |
| 2 | 13.6 | 271 |
| 3 | 13.6 | 265 |
| 4 | 13.6 | 371 |
| 5 | 13.6 | 876 |

The results indicate that increasing the amount of strength enhancer increases the 24-hour compressive strength of the set-delayed cement composition.

Example 5

The following example shows that the dissolution of the non-retarded pozzolan is responsible for the compressive-strength development for embodiments utilizing a silica-source strength enhancer comprising a pozzolan. The same set-delayed cement composition from Example 3 was split into two separate samples. Sample 7 was conditioned without a cement set activator present, and then a cement set activator comprising 5% CaCl$_2$ bwoP and 5% diatomaceous earth bwoP was added prior to curing. Sample 8 was conditioned with a cement set activator comprising 5% CaCl$_2$ bwoP and 5% diatomaceous earth bwoP present. Both samples were conditioned at 183° F. for 60 minutes and then 151° F. for 70 minutes. The results are presented in Table 11 below.

After sample 7 and 8 were conditioned and activated, the destructive compressive strength of each sample was measured by allowing the samples to cure for 24 hours in 1" by 1" plastic cylinders that were placed in an autoclave at 160° F. and 3000 psi to form set cylinders. Immediately after removal from the autoclave, destructive compressive strengths were determined using a mechanical press in accordance with API RP 10B-2, *Recommended Practice for Testing Well Cements*. The results of this test are set forth below in Table 11 in units of psi. The reported compressive strengths are an average for three cylinders of each sample.

TABLE 11

Compressive Strength Tests

| Sample | Activator (% bwoP) | | Density (ppg) | 24-Hour CS (psi) |
|---|---|---|---|---|
| | Component 1 | Component 2 | | |
| 7 (Conditioned prior to activation) | 5% CaCl$_2$ | 5% Diatomaceous Earth | 13.2 | 519 |
| 8 (Conditioned while activated) | 5% CaCl$_2$ | 5% Diatomaceous Earth | 13.2 | 1601 |

The experiment was repeated with identical parameters except the CaCl$_2$ concentration was decreased to 4.5% bwoP. The results are presented in Table 12.

TABLE 12

Compressive Strength Tests

| Sample | Activator (% bwoP) | | Density (ppg) | 24-Hour CS (psi) |
|---|---|---|---|---|
| | Component 1 | Component 2 | | |
| 9 (Conditioned prior to activation) | 4.5% CaCl$_2$ | 5% Diatomaceous Earth | 13.2 | 388 |
| 10 (Conditioned while activated) | 4.5% CaCl$_2$ | 5% Diatomaceous Earth | 13.2 | 1193 |

The experiment was repeated again with identical parameters except that no pozzolan was added to the cement set activator. The results are presented in Table 13.

TABLE 13

Compressive Strength Tests

| Sample | Activator (% bwoP) | | Density (ppg) | 24-Hour CS (psi) |
|---|---|---|---|---|
| | Component 1 | Component 2 | | |
| 11 (Conditioned prior to activation) | 5% CaCl$_2$ | — | 13.2 | 50 |
| 12 (Conditioned while activated) | 5% CaCl$_2$ | — | 13.2 | 95 |

The results indicate that subjecting a set-delayed cement composition to a conditioning sequence, even without a strength enhancer may provide some improvement in compressive strength, although this effect is much less pronounced than that observed for the cement set activators comprising strength enhancers. Overall the results demonstrate that increased temperature, over time, enhances the dissolution of the strength enhancer, but has little effect on the set-delayed cement composition by itself.

Example 6

For this example, the same set-delayed cement composition from Example 3 was activated with cement set activators comprising strength enhancers and a monovalent salt and polyphosphate. The strength enhancer was held constant and the densities for all samples were kept constant by varying the amount of water, such that the only different in each sample was the amount of CaCl$_2$. The pozzolan chosen for the experiment was diatomaceous earth.

After the set-delayed cement composition was exposed to the cement set activator, the destructive compressive strength of each sample was measured by allowing the samples to cure for 24 hours in 1" by 2" plastic cylinders that were placed in an autoclave at 160° F. to form set cylinders. Immediately after removal from the autoclave, destructive compressive strengths were determined using a mechanical press in accordance with API RP 10B-2, *Recommended Practice for Testing Well Cements*. The thickening times were measured on a high-temperature high-pressure consistometer by ramping from room temperature (e.g., about 80° F.) and ambient pressure to 183° F. and 3000 psi in 52 minutes in accordance with the procedure for determining cement thickening times set forth in API RP Practice 10B-2, *Recommended Practice for Testing Well Cements*, First Edition, July 2005. The results of this test are set forth below in Table 14. The reported results are an average for three cylinders of each sample.

TABLE 14

Compressive Strength and Thickening Time Tests

| CaCl$_2$ (% bwoP) | Diatomaceous Earth (% bwoP) | Density (ppg) | 24-Hour CS (psi) | Thickening Time (hh:mm) |
|---|---|---|---|---|
| 5 | — | 13.2 | 102 | 7:07 |
| 3.5 | 5 | 13.2 | 216 | 4:45 |
| 4 | 5 | 13.2 | 411 | 4:55 |
| 4.5 | 5 | 13.2 | 1193 | 4:59 |
| 5 | 5 | 13.2 | 1601 | 3:55 |

The results indicate that the addition of a strength enhancer reduces the thickening time of the set-delayed cement composition and also increases the compressive strength considerably. The results also indicate that CaCl$_2$ concentration has a minimal effect on thickening time in the presence of the strength enhancer.

Example 7

For this example, the same set-delayed cement composition from Example 3 was activated with either a control cement set activator (Samples 13 and 15) comprising a monovalent salt (sodium sulfate) and polyphosphate (sodium hexametaphosphate) or an experimental cement set activator (Samples 14 and 16) comprising a monovalent salt (sodium sulfate) and polyphosphate (sodium hexametaphosphate) as well as a strength enhancer (diatomaceous earth). The monovalent salt and polyphosphate were utilized in a 1:1 ratio for all experiments. The concentration of the cement set activator was varied over two data points while the strength enhancer was held constant.

After the set-delayed cement composition was exposed to either the control or the experimental cement set activator, the destructive compressive strength of each sample was measured by allowing the samples to cure for 24 hours in 1" by 2" plastic cylinders that were placed in an autoclave at 160° F. and 3000 psi to form set cylinders. Immediately after removal from the autoclave, destructive compressive strengths were determined using a mechanical press in accordance with API RP 10B-2, *Recommended Practice for Testing Well Cements*. The results of this test are set forth below in Table 15. The reported results are an average for three cylinders of each sample.

TABLE 15

Compressive Strength Tests

| Sample | Activator (% bwoP) Component 1 | Component 2 | Density (ppg) | 24-Hour CS (psi) |
|---|---|---|---|---|
| 13 | 1% SHMP | — | 13.2 | 1206 |
| 14 | 1% SHMP | 5% Diatomaceous Earth | 13.2 | 1568 |
| 15 | 0.875% SHMP | — | 13.2 | 0 |
| 16 | 0.875% SHMP | 5% Diatomaceous Earth | 13.2 | 331 |

The results indicate that the addition of a strength enhancer increases the compressive strength of the samples.

Thickening-time measurements were also taken on a portion of each samples prior to their curing for the compressive-strength testing. The samples were conditioned at 183° F. for 60 minutes and then 151° F. for 70 minutes. The thickening times were then measured on a high-temperature high-pressure consistometer by ramping from room temperature (e.g., about 80° F.) and ambient pressure to 183° F. and 3000 psi in 52 minutes in accordance with the procedure for determining cement thickening times set forth in API RP Practice 10B-2, *Recommended Practice for Testing Well Cements*, First Edition, July 2005. The results of this test are set forth below in Table 16.

TABLE 16

Thickening Time Tests

| Sample | Activator (% bwoP) Component 1 | Component 2 | Density (ppg) | Thickening Time (hh:mm) |
|---|---|---|---|---|
| 13 | 1% SHMP | — | 13.2 | 2:44 |
| 14 | 1% SHMP | 5% Diatomaceous Earth | 13.2 | 2:41 |
| 15 | 0.875% SHMP | — | 13.2 | 5:48 |
| 16 | 0.875% SHMP | 5% Diatomaceous Earth | 13.2 | 5:53 |

For this particular system, the thickening-time data when juxtaposed with the compressive-strength data shows that a silica-source strength enhancer added to a cement set activator does not alter the thickening times of the set-delayed cement compositions but does increase the compressive strength. Typically thickening time and compressive strength are linked in a direct relationship such that decreasing one causes a decrease in the other. For this system however, it is clear that thickening time and compressive strength have been decoupled.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or tem in this specification and one or more patent(s) or other documents that may be incorporated herein by reference, the definitions that are consistent with this specification should be adopted.

What is claimed is:

1. A method of cementing in a subterranean formation comprising:
   providing a cement composition comprising water, pumice, hydrated lime, a set retarder, a dispersant, and a strength enhancer, wherein the strength enhancer comprises at least one material selected from the group consisting of cement kiln dust, slag, amorphous silica, a pozzolan, and any combination thereof, wherein the set retarder comprises a phosphonic acid derivative and the dispersant comprises a polycarboxylated ether dispersant;
   introducing the cement composition into the subterranean formation; and
   allowing the cement composition to set in the subterranean formation.

2. The method of claim 1 wherein the strength enhancer comprises the cement kiln dust and wherein the cement kiln dust is present in an amount of about 50% to about 100% by weight of the pumice.

3. The method of claim 1 wherein the strength enhancer comprises the slag and wherein the slag is present in an amount of about 50% to about 100% by weight of the pumice.

4. The method of claim 1 wherein the strength enhancer comprises the pozzolan and wherein the pozzolan is selected from the group consisting of diatomaceous earth, metakaolin, fly ash, zeolite, and any combination thereof; and wherein the pozzolan is present in an amount of about 0.1% to about 20% by weight of the pumice.

5. The method of claim 1 wherein the strength enhancer comprises the pozzolan, wherein the method further comprises combining an additive comprising a cement set activator and the pozzolan with the cement composition before introducing the cement composition into the subterranean formation.

6. The method of claim 1 wherein the strength enhancer comprises the amorphous silica and wherein the amorphous silica is present in an amount of about 0.1% to about 20% by weight of the pumice.

7. The method of claim 1 wherein the cement composition further comprises a cement set activator selected from the group consisting of zeolites, amines, silicates, monovalent salts, divalent salts, nanosilica, polyphosphates, and any combination thereof.

8. The method of claim 1 wherein the cement composition further comprises a cement set activator comprising a combination of a monovalent salt and a polyphosphate.

9. The method of claim 1 wherein the cement composition is introduced into an annulus between a conduit disposed in a well bore and a wall of the well bore or another conduit.

10. The method of claim 1 further comprising, prior to the introducing step, storing the cement composition for a time period of about 7 days and then adding a cement set activator to the cement composition.

11. A cementing system comprising:
    a cement composition comprising:
       water,
       pumice,
       hydrated lime,
       a set retarder,
       a dispersant, and
       a strength enhancer, wherein the strength enhancer is selected from the group consisting of cement kiln dust, slag, amorphous silica, and a pozzolan; and
    a mixing equipment capable of mixing the cement composition; and
    pumping equipment capable of pumping the cement composition;
    wherein the set retarder comprises a phosphonic acid derivative and the dispersant comprises a polycarboxylated ether dispersant.

12. The system of claim 11 wherein the strength enhancer comprises the cement kiln dust and wherein the cement kiln dust is present in an amount of about 50% to about 100% by weight of the pumice.

13. The system of claim 11 wherein the strength enhancer comprises the slag and wherein the slag is present in an amount of about 50% to about 100% by weight of the pumice.

14. The system of claim 11 wherein the strength enhancer comprises the pozzolan and wherein the pozzolan is selected from the group consisting of diatomaceous earth, metakaolin, fly ash, zeolite, and any combination thereof; and wherein the pozzolan is present in an amount of about 0.1% to about 20% by weight of the pumice.

15. The system of claim 11 wherein the strength enhancer comprises the amorphous silica and wherein the amorphous silica is present in an amount of about 0.1% to about 20% by weight of the pumice.

16. The system of claim 11 wherein the cement composition further comprises a cement set activator selected from the group consisting of zeolites, amines, silicates, monovalent salts, divalent salts, nanosilica, polyphosphates, and any combination thereof.

17. The system of claim 11 wherein the cement composition further comprises a cement set activator comprising a combination of a monovalent salt and a polyphosphate.

* * * * *